C. J. COULTER.
COMBINATION MACHINE DRILL.
APPLICATION FILED DEC. 23, 1907.
929,563.
Patented July 27, 1909.
3 SHEETS—SHEET 1.
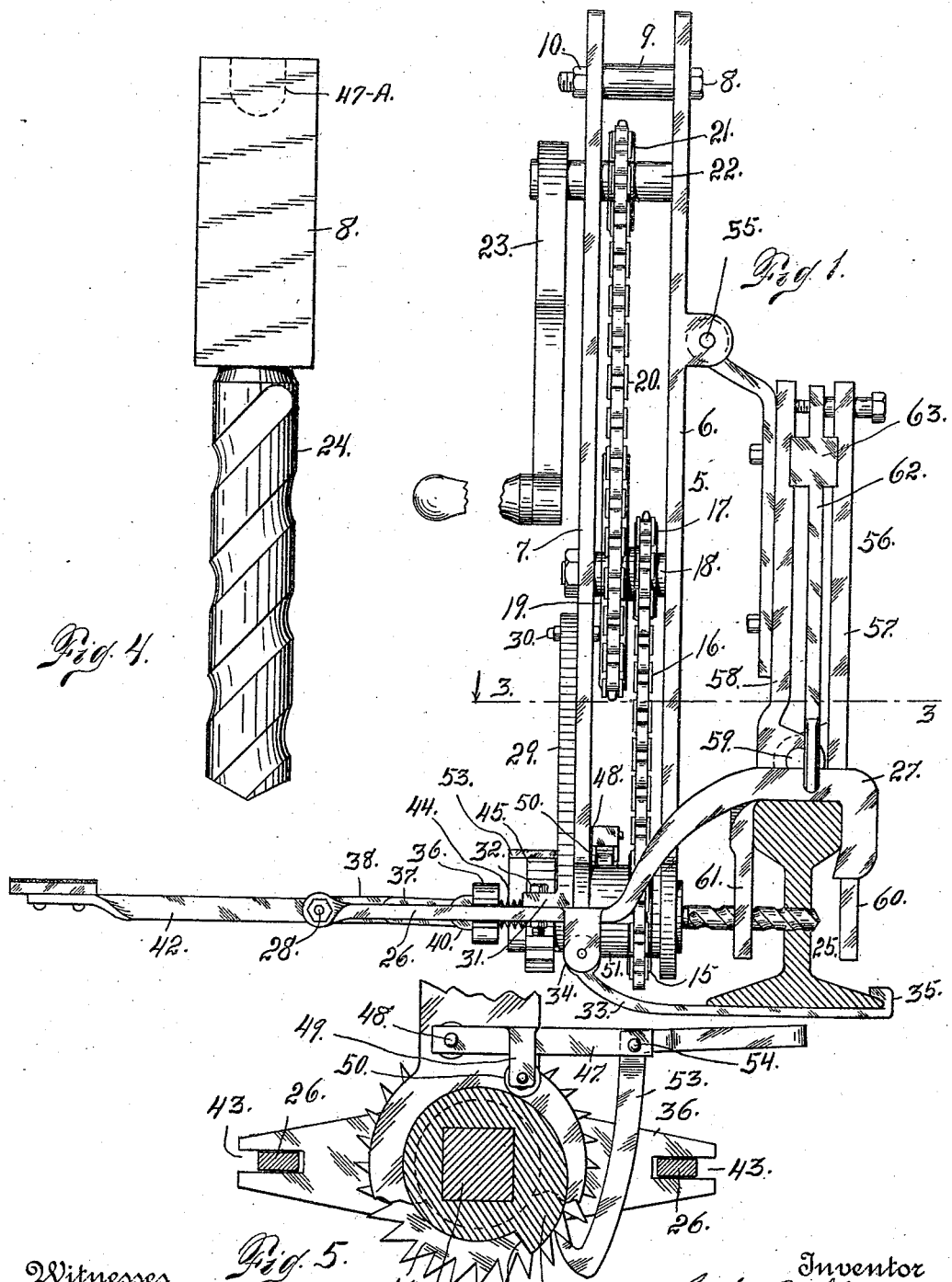

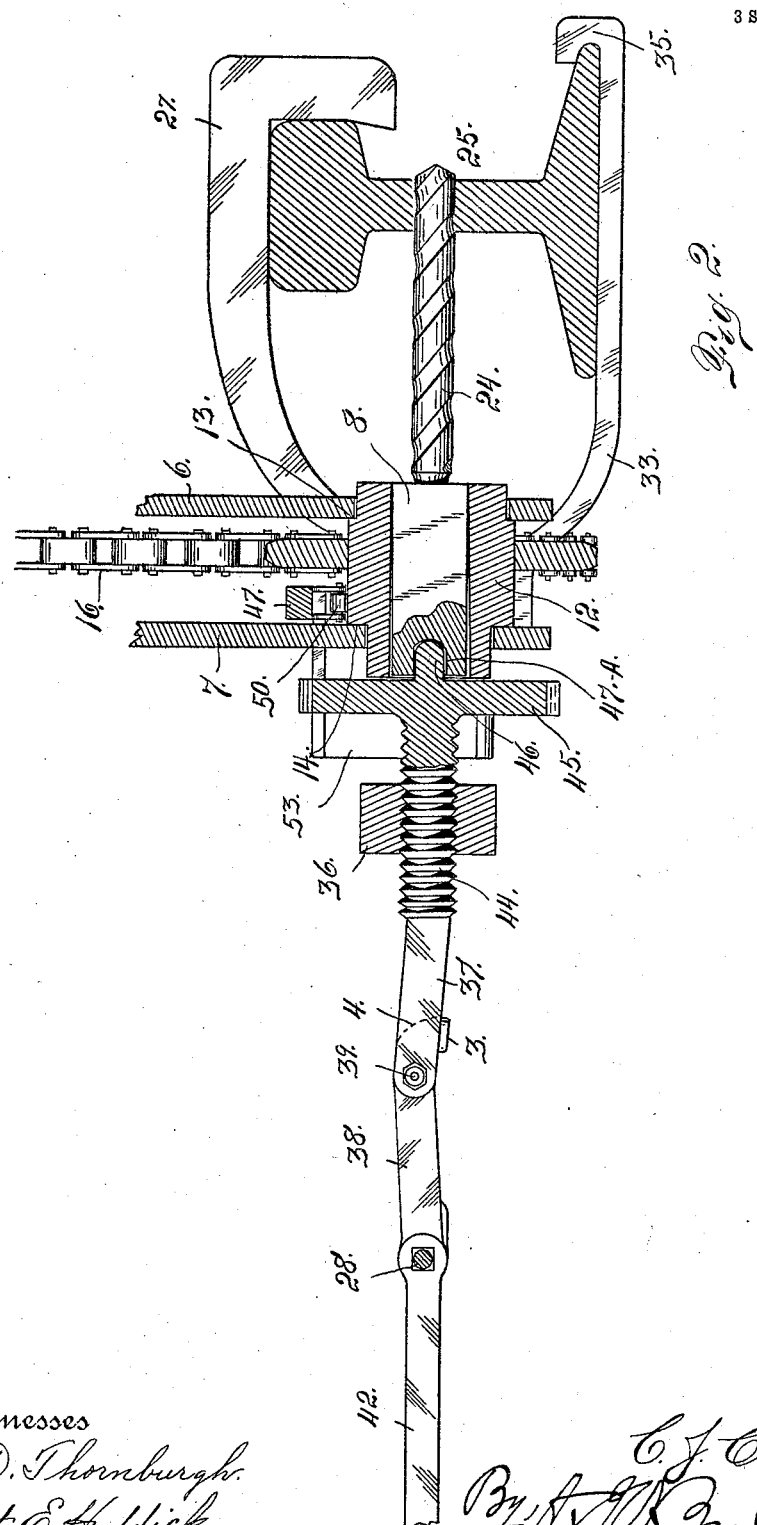

C. J. COULTER.
COMBINATION MACHINE DRILL.
APPLICATION FILED DEC. 23, 1907.
929,563.
Patented July 27, 1909.
3 SHEETS—SHEET 3.
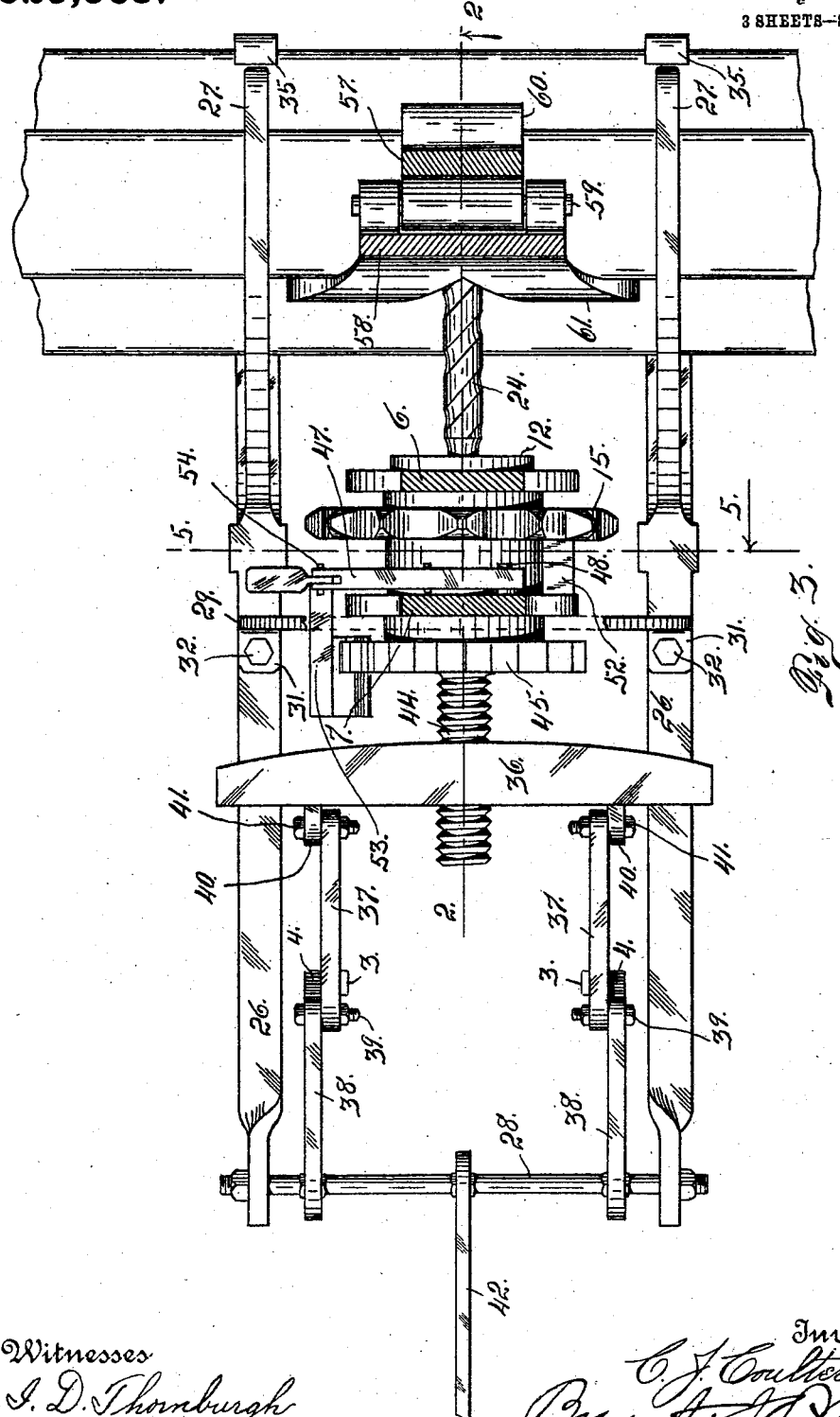
Witnesses
I. D. Thornburgh
Otto E. Haddick
Inventor
C. J. Coulter
By H. J. O'Brien
Attorney

UNITED STATES PATENT OFFICE.

CHARLES J. COULTER, OF LONGMONT, COLORADO.

COMBINATION MACHINE-DRILL.

No. 929,563.          Specification of Letters Patent.          Patented July 27, 1909.

Application filed December 23, 1907. Serial No. 407,861.

*To all whom it may concern:*

Be it known that I, CHARLES J. COULTER, a citizen of the United States, residing at Longmont, in the county of Boulder and State of Colorado, have invented certain new and useful Improvements in Combination Machine-Drills; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a machine drill in which much of the mechanism is common to the construction disclosed in my patent for a combined machine wrench and clamp, dated Nov. 19th, 1907, No. 871,482.

In my present improvement I employ practically all the mechanism disclosed in the aforesaid patent with the exception of the spindle containing the wrench socket. This spindle is removed from the rotating sleeve and a spindle substituted adapted to receive a drill tool or bit. In addition to the mechanism disclosed in the said patent, I employ one or more pairs of hook-shaped members adapted to hold the part acted upon, as a railroad rail, in operative relation with the drilling mechanism; and also means for automatically feeding the spindle longitudinally in the sleeve whereby the drill bit is moved forwardly to keep pace with its cutting action. In this connection a cross head, in which a feed screw is threaded is employed. Provision is made for the adjustment of this cross head, whereby the feed screw and its operating ratchet may be detached from the mechanism, allowing the drill spindle to be removed from the sleeve and a wrench spindle applied.

My present invention is more especially adapted for drilling holes in the web of railway rails for the purpose of making rail joints by the use of fish plates which are connected to the rails by bolts and nuts. The holes may be first drilled in the rail by the use of the drilling attachment, after which the drilling spindle and drill may be removed, and the wrench spindle put in place, after which the fish plates may be bolted to the rails and the nuts tightened thereon by the use of my improved wrench. It will thus be seen that virtually a single machine may be employed to perform both the drilling function and the function of applying the fish plates.

Having briefly outlined my improved construction, I will proceed to describe the same in detail reference being made to the accompanying drawing in which is illustrated an embodiment thereof.

In this drawing, Figure 1 is a side elevation of my improved construction shown in position for use in drilling holes in the web of a railroad rail which is shown in position and in cross section. Fig. 2 is a section taken on the line 2—2 Fig. 3. Fig. 3 is a horizontal section taken on the line 3—3 Fig. 1 looking downwardly or in the direction of the arrow. Fig. 4 is a detail view of the drill spindle showing the drilling tool in place, the parts being shown on a larger scale. Fig. 5 is a vertical section taken on the line 5—5 Fig. 3 looking toward the left or in the direction of the arrow.

The same reference characters indicate the same parts in all the views.

Let the numeral 5 designate an upright frame composed of two parallel members 6 and 7. These members are connected at the top by a bolt 8 passing through a spacing sleeve 9 and fastened by a nut 10. In the lower extremities of these members is journaled a sleeve 12 carrying a spindle 8 angular in cross section and fitted into a counterpart opening formed in the sleeve whereby the spindle is made to rotate with the sleeve. This sleeve is exteriorly provided with shoulders 13 and 14 whereby the members 6 and 7 are spaced. To the sleeve 12 is made fast a sprocket wheel 15 engaged by a chain 16 which leads to a relatively small sprocket 17 fast on a spindle 18 journaled in the upright members 6 and 7. Upon this spindle 18 is also made fast a relatively large sprocket 19, from which leads a chain 20 to a relatively small sprocket 21 fast on a spindle 22 journaled in the upper part of the frame. To this spindle 22 is applied a hand crank 23 for operating the sleeve. The spindle 8 located within the sleeve as heretofore described, has a drilling tool 24 connected to rotate therewith for performing the drilling function. As shown in the drawing the drill is shown in operative engagement with the web of a railway rail 25. As the hand crank 23 is turned, rotary motion is communicated to the drill sleeve and consequently to the drill spindle and drill.

In order to maintain the operating mechanism just described in operative relation with the rail 25, arms 26 having hook-shaped extremities 27 are employed. These arms 26 are pivotally connected at one extremity with a rock shaft 28. The arms 26 are connected with the member 7 of the upright frame by a yoke 29 having the general shape of the letter A, its upper or apex portion being connected with the frame member 7 by means of a bolt 30. The lower extremities of this yoke are flanged as shown at 31 and connected with the arms 26 by bolts 32 (see Figs. 1 and 3). The hook-shaped extremities 27 extend over the tread of the rail and downwardly on the opposite side thereof thus preventing the rail from moving away from the drill during the drilling operation. If desired arms 33 pivotally connected with depending ears 34 formed on the arms 26 may be employed. The forward extremities of the arms 33 are hook-shaped as shown at 35 and engage the edge of the base of the rail on the side remote from the operating mechanism or on the same side as the hook-shaped extremities 27 of the arms 26. A cross head 36 is connected by means of links 37 and crank arms 38 with the rock shaft 28. The arms 38 and the links 37 are pivotally connected by means of bolts 39, the links 37 being pivotally connected at their forward extremities with ears 40 formed on the cross head 36. These ears are connected with the links by bolts 41. The rock shaft 28 is provided with an operating handle 42 which is fast thereon whereby as the handle is actuated the shaft is rotated to move the cross head back and forth upon the arms 26, the extremities of the cross head being slotted to receive the said arms as shown at 43. This manipulation of the cross head is on the toggle principle since when the arms 38 and links 37 are in the straight line position, the cross head is at its forward limit of movement. As these toggle members are moved in either direction from the straight line position the cross head will be moved rearwardly upon the horizontal portions of the arms 26.

A feed screw 44 is threaded in a cross head 36 and to its forward extremity is made fast a ratchet wheel 45 having a central projection 46 formed on its forward face and engaging a counterpart socket 47<sup>A</sup> in which the projection is allowed to turn freely. Special devices are employed for actuating the ratchet to operate the feed screw whereby the spindle 8 is fed forwardly, to keep pace with the cutting action of the drill. Upon the member 7 of the upright frame, is fulcrumed a lever arm as shown at 48. This lever arm is provided with a hanger 49 upon which is mounted a roller 50 adapted to exteriorly engage the sleeve 12 as the latter is rotated. Upon this sleeve is formed a cam 51, which acts on the roller 50 to raise the lever arm 47 with each rotation of the sleeve. After the roller leaves this cam it drops down the distance of the offset 52 thus allowing a pawl 53 pivotally connected at 54 with the lever 47 to move downwardly in order to engage a lower tooth of the ratchet preparatory to another lifting operation. It will thus be seen that as the sleeve is rotated, the lever arm 47 together with the pawl 53 will be lifted to impart a partial rotary movement to the ratchet 45 and the feed screw 44, every time the sleeve is given a complete rotation. Immediately after each upward movement of the lever arm and the consequent lifting movement of the pawl whereby the ratchet is given a partial rotation, the lever arm and pawl are allowed to drop downwardly to engage the lower tooth of the ratchet. This operation continues as long as the drill mechanism is actuated.

Pivotally connected with the upright frame bar 6 as shown at 55, is a clamp 56 composed of two jaws 57 and 58 pivotally connected at 59. Below the pivot these jaws are provided with members 60 and 61 which occupy positions on opposite sides of the rail 25. In the wrench mechanism these jaws are exceedingly important since the jaw 60 engages the head of the bolt and prevents it from moving away from the fish plate while the nut is being applied to its opposite extremity by the rotation of the wrench spindle. In my improved construction this mechanism serves to support the upright frame 5 since the jaws 60 and 61 straddle the rail. The jaws 57 and 58 are operated to tighten the members 60 and 61 upon the rail, by means of a lever 62 having a separating projection 63 which when forced between the jaws above their pivot, tightens their extremities upon the rail. This supports the upright frame in its proper position for operating the drill as will be readily understood.

From the foregoing description the use and operation of my improved combination machine drill will be readily understood. Assuming that the mechanism is in the position shown in Fig. 1 of the drawing, it is only necessary to turn the crank handle 23, to communicate rotary motion to the sleeve carrying the drill operating spindle. During this operation the cam 51 of the sleeve acts on the pawl-carrying lever arm 47, to impart a partial rotary movement to the feed screw 44 through the instrumentality of the ratchet 45. By virtue of the operation of the feed screw, the drill operating spindle is moved forward to keep pace with the cutting action of the drill.

As shown in the drawing the crank arm 38 is provided at its forward extremity with a lug 4 having a laterally projecting lip 3 adapted to engage the link 37 from beneath and limit the upward movement of the pivoted extremities of the toggle members. This construction also limits the forward movement of the cross head. When it is desired to retract the cross head or move it rearwardly, the handle 42 may be actuated to move the connected extremities of the toggle members downwardly until the cross head together with the feed screw and ratchet, is retracted or moved rearwardly a sufficient distance not to interfere with the sleeve. During this operation the toggle members will first have to be moved to the straight line or dead center position. There is sufficient lost motion or play between the joints to permit this, however. As soon as this straight line position is reached, the connected extremities of the toggle members may be readily moved downwardly and as soon as this movement commences the cross head is moved rearwardly a distance corresponding with the movement of the said members.

In case it is desired to disconnect the apparatus from the rail in order to allow a train to pass, it is only necessary to lift upwardly on the frame 5, when the entire mechanism may be removed from the rail. It will of course be necessary to first retract the cross head sufficiently to disconnect the feed screw from the sleeve, thus allowing the drill and its operating spindle to move rearwardly away from the rail.

Attention is called to the fact that the operating extremity of the pawl 53, is sufficiently elongated to remain in engagement with the ratchet wheel 45, until the drill bit has been fed the required distance to drill a hole in the web of a railroad rail or other device with which the drill may be used. This feature is illustrated in Figs. 1, 2 and 3 of the drawing.

Having thus described my invention, what I claim is:

1. A machine drill comprising a frame work, a sleeve rotatably mounted in the frame work, a spindle longitudinally movable in the sleeve, adapted to carry a drill tool, an operating mechanism mounted on the frame work and connected with the sleeve to rotate with the latter, hook-shaped arms mounted on the frame work and having rearwardly projecting members, a cross head slidable on said members, a feed screw threaded in the cross head, a ratchet disk fast on the feed screw and having a projection engaging a socket in the said spindle, and mechanism engaging the ratchet and connected in operative relation with the operating mechanism for rotating the feed screw and means for taking up the thrust of the screw and cross-head, substantially as described.

2. A combination machine drill comprising an upright frame work, a sleeve journaled in the lower part of the frame work, a spindle longitudinally movable in the sleeve and adapted to receive a drilling tool, the spindle and sleeve being connected to rotate together, a cross head slidably mounted on the frame work, a feed screw threaded in the cross head, and connected in operative relation with the drill spindle, a suitable connection between the feed screw and the operating mechanism for rotating the screw, and means connected with the cross head whereby the latter may be shifted back and forth, for the purpose of disengaging the feed screw from the spindle, or connecting it in operative relation therewith, substantially as described.

3. A construction of the class described comprising an upright frame work, a sleeve journaled in the lower part of the frame work, a spindle longitudinally movable in the sleeve, and adapted to receive a drilling tool, the spindle and sleeve being connected to rotate together, a cross head slidably mounted on the frame work, a feed screw threaded in the cross head and connected in operative relation with the drill spindle, a suitable connection between the feed screw and the operating mechanism for rotating the screw, a rock shaft, and an operative connection between said shaft and the cross head, whereby the latter may be moved toward and away from the spindle, substantially as described.

In testimony whereof I affix my signature in presence of two witnesses.

CHARLES J. COULTER.

Witnesses:
JOHN W. PAXTON,
EDWARD TUGGY.